(12) United States Patent
Brown et al.

(10) Patent No.: US 8,775,798 B2
(45) Date of Patent: *Jul. 8, 2014

(54) SYSTEM AND METHOD FOR RETRIEVING CERTIFICATES ASSOCIATED WITH SENDERS OF DIGITALLY SIGNED MESSAGES

(75) Inventors: Michael Stephen Brown, Kitchener (CA); Herbert Anthony Little, Waterloo (CA); Neil Patrick Adams, Waterloo (CA); Michael Grant Kirkup, Waterloo (CA); Michael Kenneth Brown, Fergus (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,574

(22) Filed: Sep. 13, 2012

(65) Prior Publication Data

US 2013/0013918 A1      Jan. 10, 2013

Related U.S. Application Data

(63) Continuation of application No. 12/981,689, filed on Dec. 30, 2010, now Pat. No. 8,341,399, which is a continuation of application No. 10/975,987, filed on Oct. 29, 2004, now Pat. No. 7,886,144.

(51) Int. Cl.
*H04L 29/06*      (2006.01)
(52) U.S. Cl.
USPC .......................................................... 713/156
(58) Field of Classification Search
CPC .......................... H04L 63/0823; H04L 9/3263

USPC ......................................................... 713/156
See application file for complete search history.

(56) References Cited

U.S. PATENT DOCUMENTS

| | | |
|---|---|---|
| 5,948,058 A | 9/1999 | Kudoh et al. |
| 6,044,462 A | 3/2000 | Zubeldia et al. |

(Continued)

FOREIGN PATENT DOCUMENTS

| | | |
|---|---|---|
| CA | 2524607 | 10/2011 |
| EP | 0785514 | 7/1997 |

(Continued)

OTHER PUBLICATIONS

Office Action. Co-pending U.S. Appl. No. 12/981,689. Dated: Sep. 29, 2011.

(Continued)

*Primary Examiner* — Matthew Smithers
(74) *Attorney, Agent, or Firm* — Bereskin & Parr LLP/S.E.N.C.R.L., s.r.l.

(57) ABSTRACT

A system and method for retrieving certificates and/or verifying the revocation status of certificates. In one embodiment, when a user opens a digitally signed message, a certificate that is required to verify the digital signature on the message may be automatically retrieved if it is not stored on the user's computing device (e.g. a mobile device), eliminating the need for users to initiate the task manually. Verification of the digital signature may also be automatically performed by the application after the certificate is retrieved. Verification of the revocation status of a certificate may also be automatically performed if it is determined that the time that has elapsed since the status was last updated exceeds a pre-specified limit.

23 Claims, 9 Drawing Sheets

(56) References Cited

U.S. PATENT DOCUMENTS

| | | | |
|---|---|---|---|
| 6,128,740 | A | 10/2000 | Curry et al. |
| 6,285,991 | B1 | 9/2001 | Powar |
| 6,292,897 | B1 | 9/2001 | Gennaro et al. |
| 6,314,190 | B1 | 11/2001 | Zimmermann |
| 6,675,296 | B1 | 1/2004 | Boeyen et al. |
| 6,687,822 | B1 | 2/2004 | Jakobsson |
| 6,763,389 | B2 | 7/2004 | Kryskow |
| 6,796,489 | B2 | 9/2004 | Slater et al. |
| 6,851,054 | B2 | 2/2005 | Wheeler et al. |
| 6,981,148 | B1 | 12/2005 | Jim et al. |
| 6,996,711 | B2 | 2/2006 | Patterson et al. |
| 7,039,807 | B2 | 5/2006 | Spitz |
| 7,107,618 | B1 | 9/2006 | Gordon et al. |
| 7,120,793 | B2 | 10/2006 | Hope et al. |
| 7,130,886 | B2 | 10/2006 | Little et al. |
| 7,373,512 | B1 | 5/2008 | Just |
| 7,380,126 | B2 | 5/2008 | Logan et al. |
| 7,421,472 | B1 | 9/2008 | Ross, Jr. |
| 7,441,277 | B2 | 10/2008 | Burges et al. |
| 7,475,256 | B2 | 1/2009 | Cook |
| 7,483,950 | B2 | 1/2009 | Little et al. |
| 7,493,661 | B2 | 2/2009 | Liu et al. |
| 7,797,543 | B1 | 9/2010 | Campbell et al. |
| 7,886,144 | B2 * | 2/2011 | Brown et al. .......... 713/156 |
| 8,140,440 | B1 | 3/2012 | Rakowicz et al. |
| 8,341,399 | B2 * | 12/2012 | Brown et al. .......... 713/156 |
| 2002/0046250 | A1 | 4/2002 | Nassiri |
| 2002/0053023 | A1 | 5/2002 | Patterson et al. |
| 2002/0169954 | A1 | 11/2002 | Bandini et al. |
| 2003/0014365 | A1 | 1/2003 | Inada et al. |
| 2003/0028495 | A1 | 2/2003 | Pallante |
| 2003/0110376 | A1 | 6/2003 | Wiener et al. |
| 2003/0131232 | A1 | 7/2003 | Fraser et al. |
| 2003/0187942 | A1 | 10/2003 | Quine et al. |
| 2004/0003255 | A1 | 1/2004 | Apvrille et al. |
| 2004/0025057 | A1 | 2/2004 | Cook |
| 2004/0078334 | A1 | 4/2004 | Malcolm et al. |
| 2004/0133520 | A1 | 7/2004 | Callas et al. |
| 2004/0133774 | A1 | 7/2004 | Callas et al. |
| 2004/0133775 | A1 | 7/2004 | Callas et al. |
| 2004/0193917 | A1 | 9/2004 | Drews |
| 2004/0230793 | A1 | 11/2004 | Estrada et al. |
| 2004/0249817 | A1 | 12/2004 | Liu et al. |
| 2005/0080899 | A1 | 4/2005 | Vogel et al. |
| 2005/0114651 | A1 | 5/2005 | Qu et al. |
| 2005/0120212 | A1 | 6/2005 | Kanungo et al. |
| 2005/0132202 | A1 | 6/2005 | Dillaway et al. |
| 2005/0138365 | A1 | 6/2005 | Bellipady et al. |
| 2005/0148323 | A1 | 7/2005 | Little et al. |
| 2005/0172128 | A1 | 8/2005 | Little et al. |
| 2005/0193075 | A1 | 9/2005 | Haff et al. |
| 2005/0229258 | A1 | 10/2005 | Pigin |
| 2005/0262552 | A1 | 11/2005 | Brown et al. |
| 2006/0015729 | A1 | 1/2006 | Novack et al. |
| 2006/0064581 | A1 | 3/2006 | Miller et al. |
| 2007/0011737 | A1 | 1/2007 | Bandini et al. |
| 2008/0172338 | A1 | 7/2008 | Malcolm |
| 2008/0228651 | A1 | 9/2008 | Tapsell |
| 2009/0055642 | A1 | 2/2009 | Myers et al. |
| 2011/0099381 | A1 | 4/2011 | Brown et al. |
| 2012/0311323 | A1 | 12/2012 | Brown et al. |
| 2013/0007445 | A1 | 1/2013 | Brown et al. |

FOREIGN PATENT DOCUMENTS

| | | |
|---|---|---|
| EP | 1265182 | 12/2002 |
| EP | 1653696 | 3/2009 |
| EP | 2048851 | 4/2009 |
| FR | 2791203 | 9/2000 |
| HK | 1089588 | 12/2006 |
| WO | 99/08415 | 2/1999 |
| WO | 99/64946 | 12/1999 |
| WO | 01/26401 | 4/2001 |
| WO | 03/075530 | 9/2003 |

OTHER PUBLICATIONS

Reply. Co-pending U.S. Appl. No. 12/981,689. Dated: Dec. 23, 2011.
Final Office Action. Co-pending U.S. Appl. No. 12/981,689. Dated: Mar. 2, 2012.
Reply to Final Office Action. Co-pending U.S. Appl. No. 12/981,689. Dated: Apr. 26, 2012.
Advisory Action. Co-pending U.S. Appl. No. 12/981,689. Dated: May 7, 2012.
Notice of Appeal. Co-pending U.S. Appl. No. 12/981,689. Dated: Jun. 4, 2012.
Interview Summary. Co-pending U.S. Appl. No. 12/981,689. Dated: Jul. 11, 2012.
Appeal Brief. Co-pending U.S. Appl. No. 12/981,689. Dated: Aug. 3, 2012.
Notice of Allowance. Co-pending U.S. Appl. No. 12/981,689. Dated: Aug. 31, 2012.
Request for Continued Examination (RCE) and Amendment. Co-pending U.S. Appl. No. 12/981,689. Dated: Sep. 18, 2012.
Notice of Allowance. Co-pending U.S. Appl. No. 12/981,689. Dated: Sep. 28, 2012.
European Examination Report. Application No. 08166395.7. Dated: Aug. 21, 2009.
Canadian First Office Action. Application No. 2,524,607. Dated: Jul. 20, 2009.
European Search and Examination Report. Application No. 04105423.0. Dated: Feb. 23, 2005.
European Summons to Attend Oral Proceedings Pursuant to Rule 115(1) EPC. Application No. 04105423.0. Dated: May 8, 2008.
Co-pending U.S. Appl. No. 10/092,325, "System and Method for Providing Secure Message Signature Status and Trust Status Indication", filed Mar. 6, 2002.
United States Office Action. U.S. Appl. No. 10/092,325. Dated: Mar. 22, 2005.
Response. U.S. Appl. No. 10/092,325. Dated: Aug. 22, 2005.
Notice of Allowance. U.S. Appl. No. 10/092,325. Dated: Oct. 26, 2005.
Request for Continued Examination and Information Disclosure Statement. U.S. Appl. No. 10/092,325. Dated: Jan. 25, 2006.
Notice of Allowance. U.S. Appl. No. 10/092,325. Dated: Jun. 23, 2006.
European Examination Report. Application No. 04105423.0. Dated: Oct. 17, 2007.
European Communication pursuant to Article 96(2) EPC. Application No. 04105423.0. Dated: Jul. 25, 2006.
Crocker, S. et al., "MIME Object Security Services", Request for Comments, Oct. 1995, pp. 1-48.
Zimmerman, P. et al., "Introduction to Cryptography (PGP 6.5 User's Guide)", Jun. 6, 1999, pp. 1-88.
"BlackBerry Security with the S/MIME Support Package version 1.5", Research in Motion Limited, Dec. 17, 2003, pp. 1-24.
Co-pending U.S. Appl. No. 11/525,701, "System and Method for Providing Secure Message Signature Status and Trust Status Indication", filed Sep. 22, 2006.
Office Action: Co-pending U.S. Appl. No. 11/525,701. Dated: Apr. 7, 2008.
Amendment. Co-pending U.S. Appl. No. 11/525,701. Dated: Jul. 7, 2008.
Notice of Allowance. Co-pending U.S. Appl. No. 11/525,701. Dated: Sep. 19, 2008.
Stallings W: "The PGP Web of Trust", BYTE, McGraw-Hill Inc., St. Peterborough, USA, Feb. 1, 1995, pp. 161 to 162, XP-494702.
Schneier, Bruce: "Applied Cryptography, Second Edition" 1996, John Wiley & Sons, Inc. New York, pp. 38-39.
PGP Freeware for Windows; User's Guide, Version 7.0, (Jan. 2001).
Chadwick D. et al.: "Merging and Extending the PGP and PEM Trust Models—The ICE-TEL Trust Model," IEEE Network, New York, USA, May 1, 1997, pp. 16 to 24, XP-689785.
Caronni G.: "Walking the Web of Trust," Enabling Technologies: Infrastructure for Collaborative Enterprises, 2000. (Wet ICE 2000). Proceedings. IEEE 9th International Workshops on Gaithersburg, MD, USA, Los Alamitos, CA, USA, Jun. 14-16, 2000, pp. 153 to 158, XP-10522927.

(56) References Cited

OTHER PUBLICATIONS

Preneel B.: "Cryptographic Hash Functions" European Transactions on Telecommunications and Related Technologies, vol. 5, No. 4 (Jul. 1, 1994), pp. 17-34, XP000460559.
Herda, S.: "Non-Repudiation: Constituting Evidence and Proof in Digital Cooperation," Computer Standards and Interfaces, vol. 17, No. 1, pp. 69-79, 1995 Elsevier Science B.V.
Response. European Application No. 04105423.0. Dated: Nov. 14, 2005.
Response. European Application No. 04105423.0. Dated: Nov. 23, 2006.
Response. European Application No. 04105423.0. Dated: Apr. 17, 2008.
Response. European Application No. 04105423.0. Dated: Sep. 12, 2008.
Provision of the minutes in accordance with Rule 124(4) EPC. European Application No. 04105423.0. Dated: Oct. 21, 2008.
Decision to grant a European patent pursuant to Article 97(1) EPC. European Application No. 04105423.0. Dated: Feb. 12, 2009.
Response. European Application No. 08166395.7. Dated: Jul. 23, 2009.
Response. European Application No. 08166395.7. Dated: Dec. 22, 2009.
Response. European Application No. 08166395.7. Dated: Jul. 11, 2011.
Request for Continued Examination (RCE). Co-pending U.S. Appl. No. 10/092,325. Dated: Jan. 30, 2006.
Exam Report. European Application No. 08166395.7. Dated: Feb. 16, 2012.
Response. European Application No. 08166395.7. Dated: Jun. 21, 2012.
Exam Report. European Application No. 08166395.7. Dated: Jul. 26, 2012.
Co-pending U.S. Appl. No. 13/614,824, "System and Method for Retrieving Certificates Associated with Senders of Digitally Signed Messages", filed Sep. 13, 2012.
Co-pending U.S. Appl. No. 12/981,689, "System and Method for Retrieving Certificates Associated with Senders of Digitally Signed Messages", filed Dec. 30, 2010.
Prosecution Documents for U.S. Appl. No. 10/975,987, issued to U.S. Patent No. 7,886,144 on Feb. 8, 2011.
Office Action. U.S. Appl. No. 13/614,824. Dated: Nov. 25, 2013.
Noting of withdrawal. European Patent Application No. 08166395.7. Dated: Jan. 9, 2013.
Certificate of Grant of Patent. Hong Kong Patent Application No. 06111496.0. Dated: Jun. 26, 2009.
Response. U.S. Appl. No. 13/614,824. Dated: Feb. 25, 2014.
Notice of Allowance. U.S. Appl. No. 13/614,824. Dated: Mar. 11, 2014.

\* cited by examiner

SYSTEM AND METHOD FOR RETRIEVING CERTIFICATES ASSOCIATED WITH SENDERS OF DIGITALLY SIGNED MESSAGES

CROSS-REFERENCE TO RELATED APPLICATIONS

This application is a continuation of, and claims priority to, prior U.S. patent application Ser. No. 12/981,689, filed on Dec. 30, 2010, which is a continuation of, and claims priority to, prior U.S. patent application Ser. No. 10/975,987, filed on Oct. 29, 2004. U.S. patent application Ser. No. 10/975,987 issued to patent as U.S. Pat. No. 7,886,144, and U.S. patent application Ser. No. 12/981,689 issued to patent as U.S. Pat. No. 8,341,399. The entire contents of U.S. patent application Ser. No. 12/981,689 and U.S. patent application Ser. No. 10/975,987 are hereby incorporated by reference.

FIELD OF THE INVENTION

The invention relates generally to the processing of messages, such as e-mail messages, and more specifically to a system and method for retrieving certificate data associated with encoded messages.

BACKGROUND OF THE INVENTION

Electronic mail ("e-mail") messages may be encoded using one of a number of known protocols. Some of these protocols, such as Secure Multiple Internet Mail Extensions ("S/MIME") for example, rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. The authenticity of public keys used in the encoding of messages may be validated using certificates. In particular, if a user of a computing device wishes to encrypt a message before the message is sent to a particular individual, the user will require a certificate for that individual. That certificate will typically comprise the public key of the individual, as well as other identification-related information. Similarly, if a user of a computing device receives a message that has been digitally signed by a particular individual, the user will require the proper certificate (comprising a public key) for that individual if the user wishes to verify the digital signature on the message. In some variant systems, a Pretty Good Privacy (PGP) key or some other object that serves to bind the sender's identity and a public key would be required to verify the digital signature of a message.

Typically, in known e-mail applications, if the certificate that is required to verify the digital signature of a signed message received by a user is not stored at the user's computing device, the user may attempt to search for and retrieve the requisite certificate (e.g. from a remote certificate server) by manually opening a different application to initiate the search and retrieval of the certificate. The user may then initiate a verification of the digital signature with the retrieved certificate through the e-mail application.

Furthermore, even if the certificate required to verify the digital signature of a signed message received by a user is already stored on the user's computing device, the user may wish to determine an up-to-date revocation status for that certificate. Typically, in known e-mail applications, the user may initiate a verification of the revocation status of certificates in order to retrieve such information manually, by identifying a specific certificate and selecting a corresponding menu option, for example.

SUMMARY OF THE INVENTION

Embodiments of the invention are generally directed to a system and method for retrieving certificates and/or verifying the revocation status of certificates that automate at least some of the tasks typically performed manually by users in known techniques. More specifically, at least some embodiments of the invention may be employed to facilitate the automatic retrieval of at least one of certificates and the revocation status of certificates associated with senders of digitally signed messages, where the receipt of such messages by a user triggers the automatic retrieval.

In one broad aspect, there is provided a method of retrieving certificates associated with senders of digitally signed messages received at a computing device, wherein the method is performed by an application executing on the computing device, the method comprising the steps of: detecting when a message comprising a digital signature of the sender of the message is received by a user; identifying a certificate associated with the sender that comprises a public key capable of verifying the digital signature; determining whether the certificate is stored on the computing device; and retrieving the certificate from a certificate store remotely located from the computing device if the certificate is determined to be not stored on the computing device; wherein performance by the application of at least the retrieving step is triggered by the receipt of the message by the user as detected at the detecting step.

In another broad aspect, a further step of verifying the digital signature may be performed by the application after the certificate is retrieved, without user intervention.

In another broad aspect, a further step of verifying at least one certificate property of the certificate may be performed by the application after the certificate is retrieved, without user intervention. Examples of certificate properties may include the trust status of the certificate, the expiration status of the certificate, the strength of the public key of the certificate, and the revocation status of the certificate.

In another broad aspect, there is provided a method of verifying the revocation status of certificates associated with senders of digitally signed messages received at a computing device, wherein the method is performed by an application executing on the computing device, the method comprising the steps of: detecting when a message comprising a digital signature of the sender of the message is received by a user; identifying a certificate associated with the sender that comprises a public key capable of verifying the digital signature; and verifying the revocation status of the certificate, wherein the verifying step comprises determining an amount of time that has elapsed since the revocation status of the certificate was last verified and retrieving an updated revocation status for the certificate if the determined amount of time exceeds a pre-specified limit; wherein performance by the application of at least the step of verifying the revocation status of the certificate is triggered by the receipt of the message by the user as detected at the detecting step.

BRIEF DESCRIPTION OF THE DRAWINGS

For a better understanding of embodiments of the invention, and to show more clearly how it may be carried into effect, reference will now be made, by way of example, to the accompanying drawings in which.

DETAILED DESCRIPTION OF EMBODIMENTS OF THE INVENTION

Some embodiments of the invention make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 1:
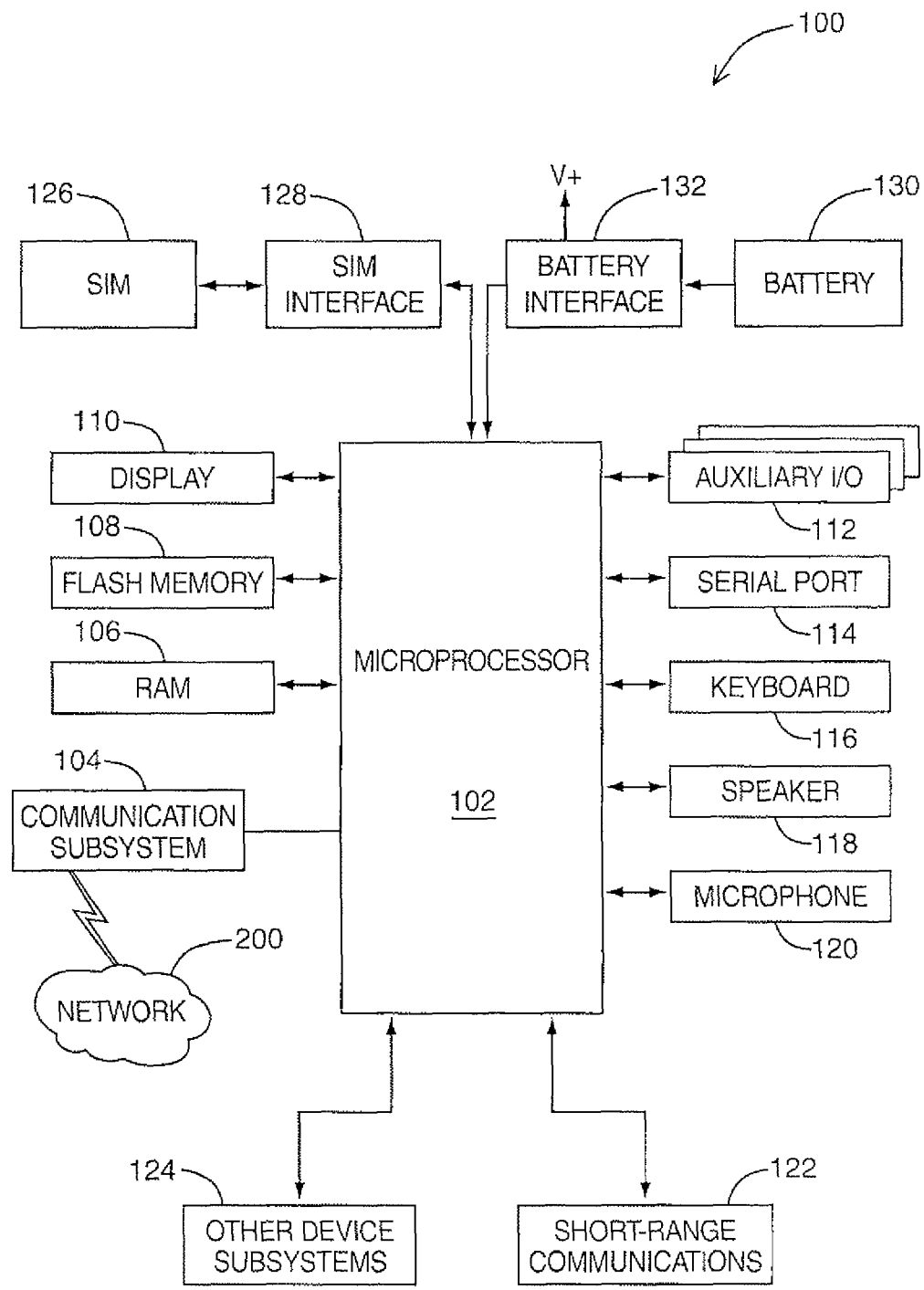
FIG. 1 is a block diagram of a mobile device in one example implementation.
Figure 2:
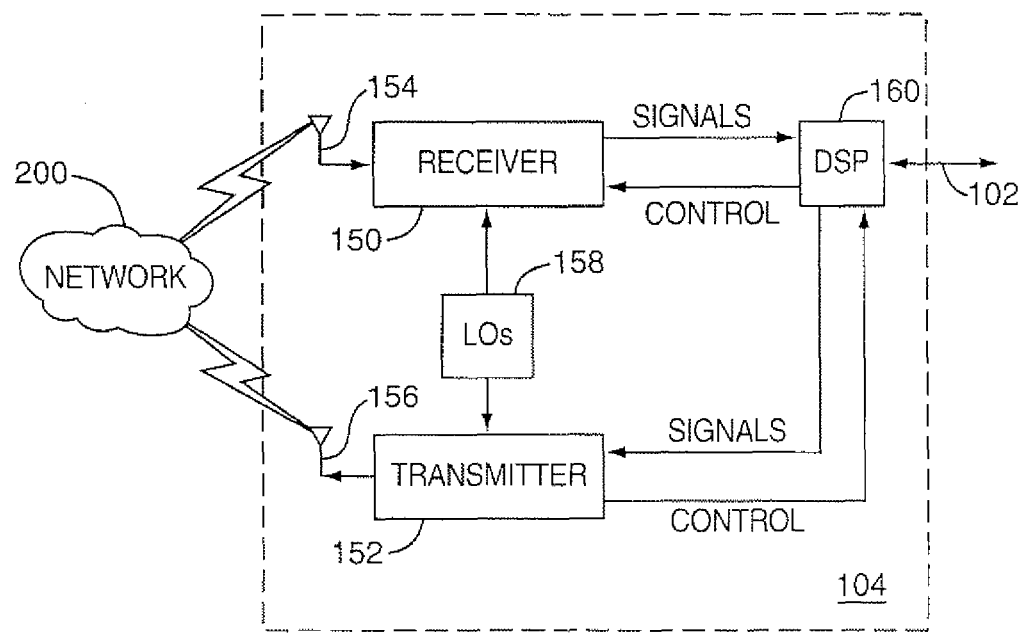
FIG. 2 is a block diagram of a communication subsystem component of the mobile device of FIG. 1.
Figure 3:
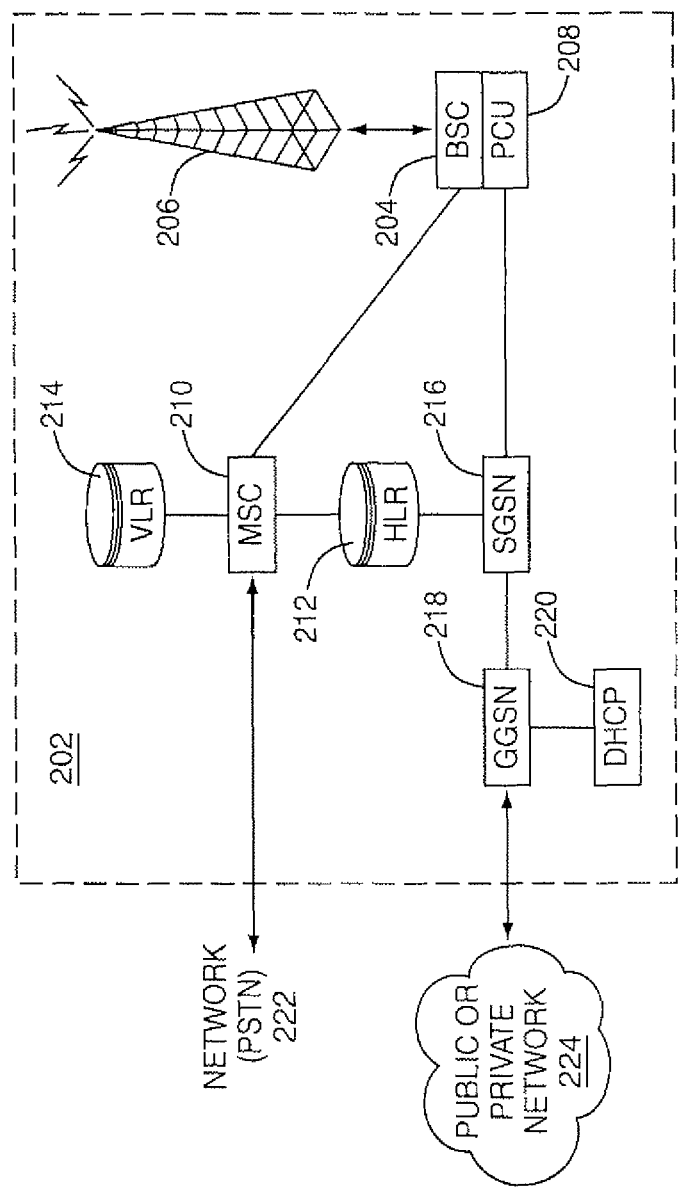
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (COMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications subsystem 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
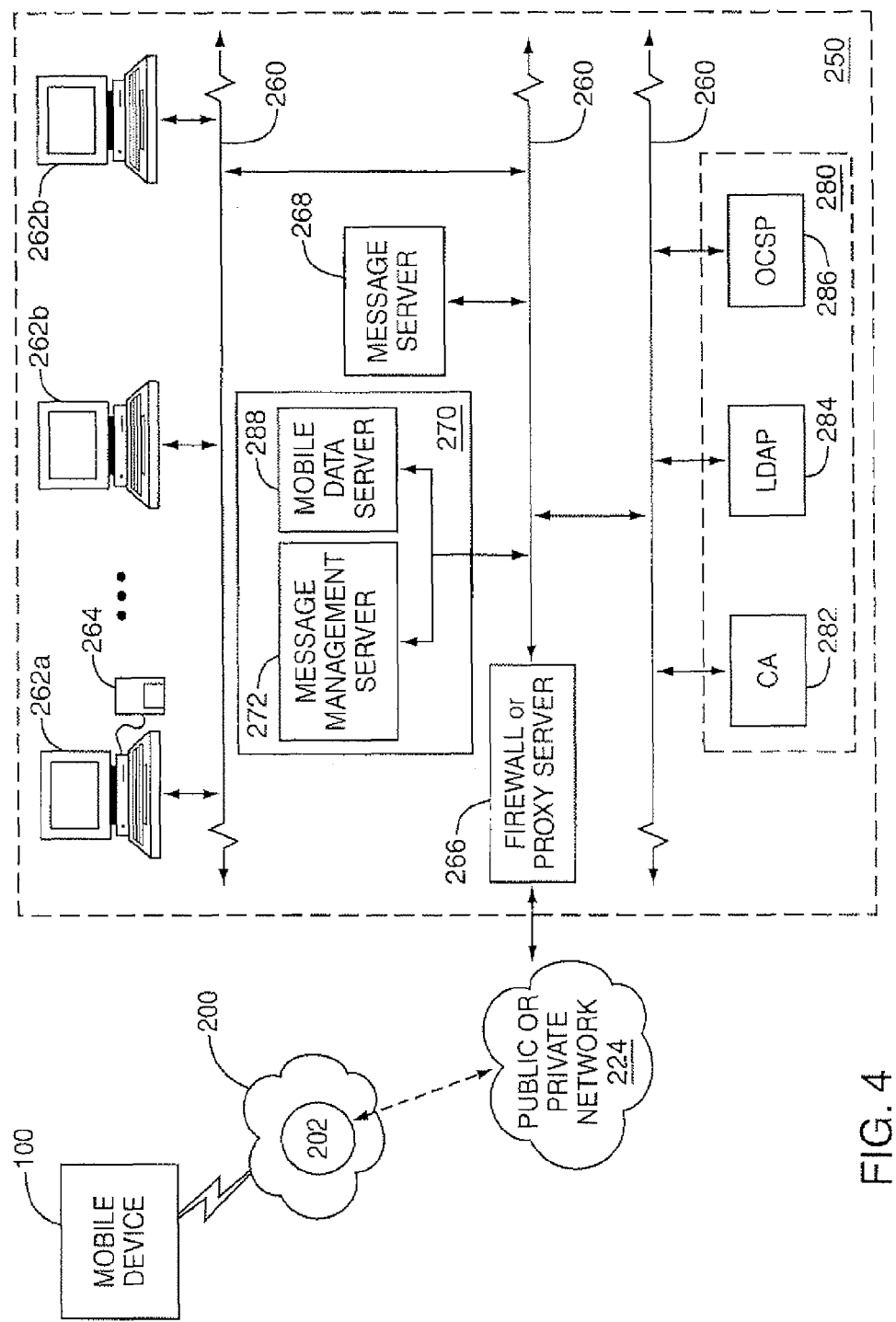
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computer 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include certificates used in the exchange of messages. It will be understood by persons skilled in the art that user computers 262a, 262b will typically be also connected to other peripheral devices not explicitly shown in FIG. 4.

Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages would then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices need to be supported.

Embodiments of the invention relate generally to certificates used in the processing of encoded messages, such as e-mail messages that are encrypted and/or signed. While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and protects data integrity and privacy from the time an originator of a message sends a message until it is decoded and read by the message recipient. Other known standards and protocols may be employed to facilitate secure message communication, such as Pretty Good Privacy™ (PGP), OpenPGP, and others known in the art.

Secure messaging protocols such as S/MIME rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. Private key information is never made public, whereas public key information is shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate decryption of the message, and in this way, the confidentiality of messages can be maintained.

As a further example, a sender may sign a message using a digital signature. A digital signature is a digest of the message (e.g. a hash of the message) encoded using the sender's private key, which can then be appended to the outgoing message. To verify the digital signature of the message when received, the recipient uses the same technique as the sender (e.g. using the same standard hash algorithm) to obtain a digest of the received message. The recipient also uses the sender's public key to decode the digital signature, in order to obtain what should be a matching digest for the received message. If the digests of the received message do not match, this suggests that either the message content was changed during transport and/or the message did not originate from the sender whose public key was used for verification. Digital signature algorithms are designed in such a way that only someone with knowledge of the sender's private key should be able to encode a signature that the recipient will decode correctly using the sender's public key. Therefore, by verifying a digital signature in this way, authentication of the sender and message integrity can be maintained.

An encoded message may be encrypted, signed, or both encrypted and signed. The authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509).

Figure 5:
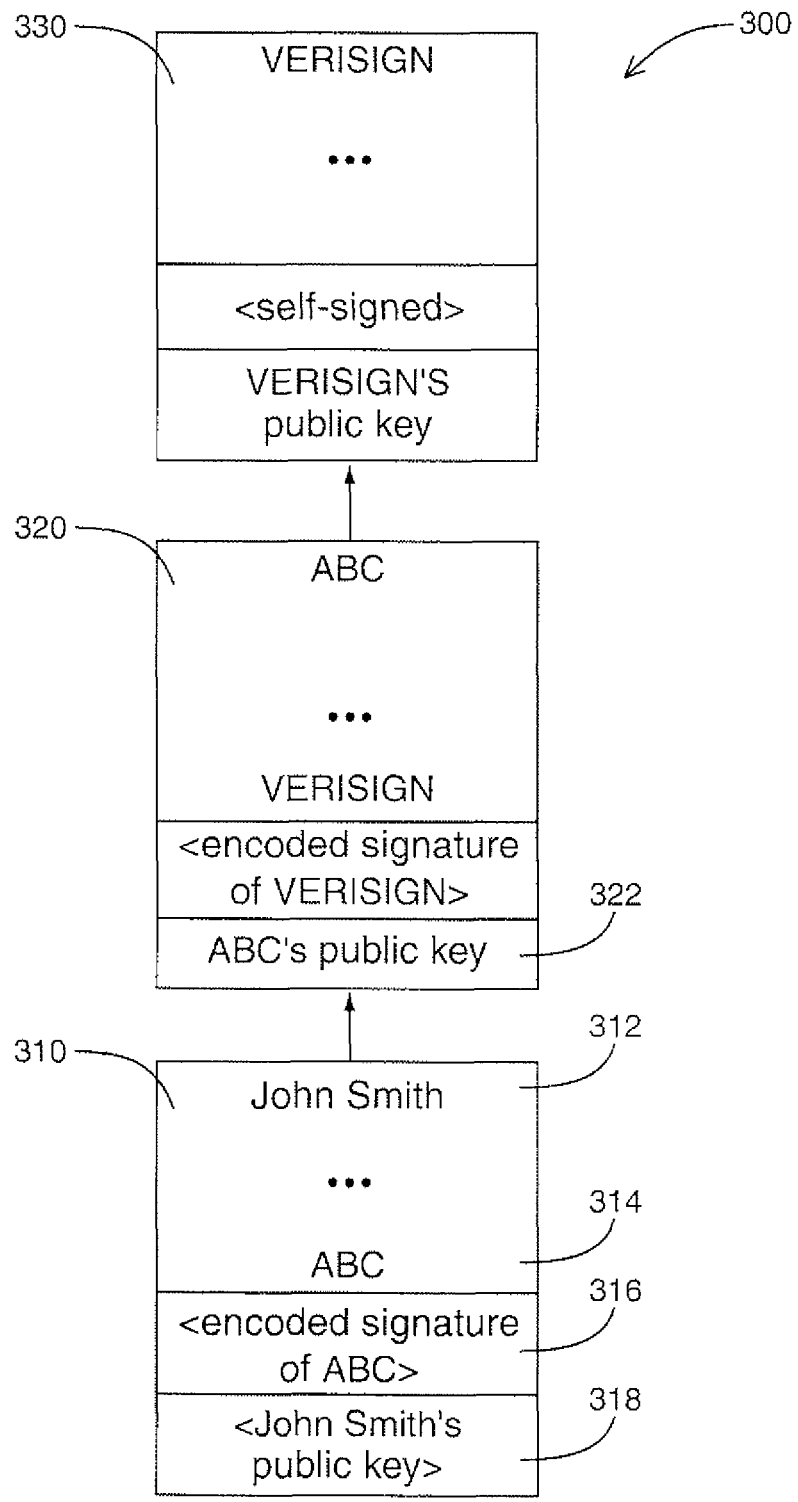
FIG. 5 is a block diagram showing an example of a certificate chain.

Consider FIG. 5, in which an example certificate chain 300 is shown. Certificate 310 issued to "John Smith" is an example of a certificate issued to an individual, which may be referred to as an end entity certificate. End entity certificate 310 typically identifies the certificate holder 312 (i.e. John Smith in this example) and the issuer of the certificate 314, and includes a digital signature of the issuer 316 and the certificate holder's public key 318. Certificate 310 will also typically include other information and attributes that identify the certificate holder (e.g. e-mail address, organization name, organizational unit name, location, etc.). When the individual composes a message to be sent to a recipient, it is customary to include that individual's certificate 300 with the message.

For a public key to be trusted, its issuing organization must be trusted. The relationship between a trusted CA and a user's public key can be represented by a series of related certificates, also referred to as a certificate chain. The certificate chain can be followed to determine the validity of a certificate.

For instance, in the example certificate chain 300 shown in FIG. 5, the recipient of a message purported to be sent by John Smith may wish to verify the trust status of certificate 310 attached to the received message. To verify the trust status of certificate 310 on a recipient's computing device (e.g. computer 262a of FIG. 4) for example, the certificate 320 of issuer ABC is obtained, and used to verify that certificate 310 was indeed signed by issuer ABC. Certificate 320 may already be stored in a certificate store on the computing device, or it may need to be retrieved from a certificate store or source (e.g. LDAP server 284 of FIG. 4 or some other public or private LDAP server). If certificate 320 is already stored in the recipient's computing device and the certificate has been designated as trusted by the recipient, then certificate 310 is considered to be trusted since it chains to a stored, trusted certificate.

However, in the example shown in FIG. 5, certificate 330 is also required to verify the trust status of certificate 310. Certificate 330 is self-signed, and is referred to as a "root certificate". Accordingly, certificate 320 may be referred to as an "intermediate certificate" in certificate chain 300; any given certificate chain to a root certificate, assuming a chain to the root certificate can be determined for a particular end entity certificate, may contain zero, one, or multiple intermediate certificates. If certificate 330 is a root certificate issued by a trusted source (from a large certificate authority such as Verisign or Entrust, for example), then certificate 310 may be considered to be trusted since it chains to a trusted certificate. The implication is that both the sender and the recipient of the message trust the source of the root certificate 330. If a certificate cannot be chained to a trusted certificate, the certificate may be considered to be "not trusted".

Certificate servers store information about certificates and lists identifying certificates that have been revoked. These certificate servers can be accessed to obtain certificates and to verify certificate authenticity and revocation status. For example, a Lightweight Directory Access Protocol (LDAP) server may be used to obtain certificates, and an Online Certificate Status Protocol (OCSP) server may be used to verify certificate revocation status.

Standard e-mail security protocols typically facilitate secure message transmission between non-mobile computing devices (e.g. computers 262a, 262b of FIG. 4; remote desktop devices). Referring again to FIG. 4, in order that signed messages received from senders may be read from mobile device 100 and encrypted messages be sent to those senders, mobile device 100 is adapted to store certificates and associated public keys of other individuals. Certificates stored on a user's computer 262a will typically be downloaded from computer 262a to mobile device 100 through cradle 264, for example.

Certificates stored on computer 262a and downloaded to mobile device 100 are not limited to certificates associated with individuals but may also include certificates issued to CAs, for example. Certain certificates stored in computer 262a and/or mobile device 100 can also be explicitly designated as "trusted" by the user. Accordingly, when a certificate is received by a user on mobile device 100, it can be verified on mobile device 100 by matching the certificate with one stored on mobile device 100 and designated as trusted, or otherwise determined to be chained to a trusted certificate.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key is preferably exchanged between the computer 262a and mobile device 100 so that the user may share one identity and one method for accessing messages.

User computers 262a, 262b can obtain certificates from a number of sources, for storage on computers 262a, 262b and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 4, multiple PKI servers 280 associated with the organization reside on LAN 250. PKI servers 280 include a CA server 282 for issuing certificates, an LDAP server 284 used to search for and download certificates (e.g. for individuals within the organization), and an OCSP server 286 used to verify the revocation status of certificates.

Certificates may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates through a mobile data server 288. Similarly, mobile data server 288 may be adapted to allow mobile device 100 to directly query OCSP server 286 to verify the revocation status of certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of certificates [not shown] may include a Windows certificate store, another secure certificate store on or outside LAN 250, and smart cards, for example.

Figure 6:
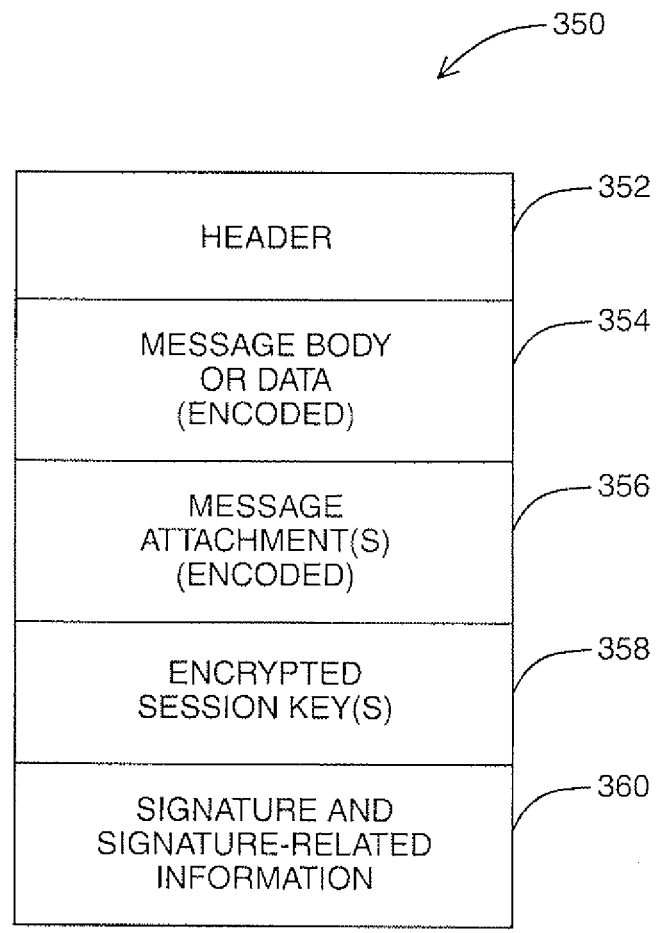
FIG. 6 is a block diagram illustrating components of an example of an encoded message.

Referring now to FIG. 6, a block diagram illustrating components of an example of an encoded message, as may be received by a message server (e.g. message server 268 of FIG. 4), is shown generally as 350. Encoded message 350 typically includes one or more of the following: a header portion 352, an encoded body portion 354, optionally one or more encoded attachments 356, one or more encrypted session keys 358, and signature and signature-related information 360. For example, header portion 352 typically includes addressing information such as "To", "From", and "CC" addresses, and may also include message length indicators, and sender encryption and signature scheme identifiers, for example. Actual message content normally includes a message body or data portion 354 and possibly one or more attachments 356, which may be encrypted by the sender using a session key. If a session key was used, it is typically encrypted for each intended recipient using the respective public key for each recipient, and included in the message at 358. If the message was signed, a signature and signature-related information 360 are also included. This may include the sender's certificate, for example.

The format for an encoded message as shown in FIG. 6 is provided by way of example only, and persons skilled in the art will understand that embodiments of the invention will be applicable to encoded messages of other formats. Depending on the specific messaging scheme used, components of an encoded message may appear in a different order than shown in FIG. 6, and an encoded message may include fewer, additional, or different components, which may depend on whether the encoded message is encrypted, signed or both.

Embodiments of the invention relate generally to the processing of encoded messages received by a user that have been digitally signed by a sender, and are also generally directed to a system and method for retrieving certificates and/or verifying the revocation status of certificates that automate at least some of the tasks typically performed manually by users in known techniques.

A digitally signed message that is received by a user of a computing device (e.g. mobile device 100) typically contains information identifying the signer's certificate (i.e. the certificate of the sender of the message), such as an identification of the certificate's issuer and serial number, or a certificate thumbprint (e.g. a hash of certificate data). The identifying information may have been included in the signed message by the sender of the message, or it may have been included by an intermediate server (e.g. message management server 272) that has performed some pre-processing on the message, for example. This information allows applications executing on the computing device (e.g. an e-mail application) to identify the correct certificate containing the public key necessary to verify the digital signature, and to determine if that certificate is stored on the computing device. For example, the certificate may be temporarily stored on the computing device if it accompanied the received message, or the certificate may be more permanently stored on the computing device in a certificate store.

Typically, in known e-mail applications, if the certificate that is required to verify the digital signature of a signed message received by a user is not stored at the user's computing device, the user may attempt to search for and retrieve the requisite certificate (e.g. from a remote certificate server) by manually opening a different application to initiate the search and retrieval of the certificate. The user may then initiate a verification of the digital signature with the retrieved certificate through the e-mail application.

Even if the certificate required to verify the digital signature of a signed message received by a user is already stored on the user's computing device, the user may wish to determine an up-to-date revocation status for that certificate. Typically, in current e-mail applications, the user may manually initiate a verification of the revocation status of certificates in order to retrieve such information, by identifying a specific certificate and selecting a corresponding menu option, for example.

Certain tasks performed in the processing of digitally signed messages received by a user, such as the retrieval of requisite certificates as noted above, are typically initiated manually by users in known systems. This may be attributed to the fact that when a user wishes to send an encrypted message using public key encryption to another individual, the certificate (or at least a public key) of that individual is required. In contrast, in situations where a user receives a signed message from another individual, the certificate of that individual is not necessary in order for the user to read the message and understand its contents if the message is not encrypted; the certificate is only necessary if the user wishes to verify the authenticity of the sender or integrity of the message. Since verification of digital signatures can be performed at the option of the user, the task of retrieving certificates to perform such verifications is typically initiated manually.

Moreover, certificates that are issued to individuals are revoked relatively infrequently. For example, a user's certificate may be revoked if the user leaves an organization, or if the security of the user's private key has been compromised, for example. These events are generally uncommon. As a result, the task of verifying the revocation status of certificates is also typically initiated manually by users in known systems. However, a certificate may be revoked at any time, and if the revocation status is not updated sufficiently often, there is a risk that a digital signature may be verified using an unknowingly revoked certificate.

The inventors have realized that by automating at least some of these tasks, additional protection may be afforded to the user, as the user may inadvertently forget to perform the tasks, and wrongly assume that the authenticity of the sender and integrity of a particular message can be trusted or that a certificate has not yet been revoked. Some users who find the manual tasks cumbersome or time-consuming may decide not to perform them, choosing instead to risk trusting the authenticity and integrity of the message. By automating at least some of these tasks, additional protection may be provided while minimizing inconvenience to the user.

In accordance with at least one embodiment of the invention, when the recipient receives a digitally signed message, an action to automatically retrieve the certificate required to verify the digital signature takes place, if it is determined that the certificate is not available locally at the user's computing device. This action is triggered by the receipt of the digitally signed message by the user. It is performed by an application, such as an e-mail application for example, without user intervention (i.e. without requiring the user to manually initiate the search for or retrieval of the certificate). This embodiment is described in further detail with reference to FIG. 7A below.

For example, this action may include contacting one or more LDAP servers (e.g. LDAP server 284 or some other public or private LDAP server) from which the certificate might be retrieved. The LDAP server(s) to be contacted may be preconfigured on the computing device, for example.

As a further example, if an intermediate server (e.g. message management server 272) has performed some pre-processing of the received message and the requisite certificate is residing on the intermediate server, the action may include contacting the intermediate server to obtain the certificate. The intermediate server may be optimized to store certificates retrieved as a result of the pre-processing of messages, but not to forward certificates to the user unless they are specifically requested, in order to preserve bandwidth in the event that a given certificate is already stored on the user's computing device.

In accordance with at least one other embodiment of the invention, when the recipient receives a digitally signed message, an action to automatically verify the revocation status of the message sender's certificate takes place, if the certificate is already stored on the computing device, and if it is determined that the revocation status requires updating. This action may be triggered by the receipt of the digitally signed message by the user. It is performed by an application, such as an e-mail application for example, without user intervention (i.e. without requiring the user to manually initiate the verification of the revocation status) if the certificate is available at the user's computing device (e.g. the certificate was already stored on the user's computing device or was successfully retrieved). Accordingly, the revocation status of a sender's certificate may be updated automatically every time a message of the sender is received by the user. This embodiment is described in further detail with reference to FIG. 7B below.

In one embodiment, this action may include determining the amount of time that has elapsed since the revocation status of the sender's certificate was last verified, and retrieving an updated revocation status for the certificate if the determined amount of time exceeds a pre-specified limit, from an OCSP server (e.g. OCSP server 286) for example. A time stamp indicating the time (which typically includes the date) of a certificate's most recent revocation status verification may be recorded in a status object stored in a table indexed by certificate (e.g. identified by issuer name and serial number or thumbprint), for example. This time stamp may be compared to the current time to make the requisite determination.

The pre-specified limit may be established by the user, or by an organization associated with the user as defined by IT Policy, for example. A policy file stored on the computing device, for example, may be employed to facilitate enforcement of the IT Policy on the device.

With respect to at least some of the embodiments described herein, a message is considered as being received by the user when the user opens (or re-opens) the message for viewing, which is typically done through an e-mail client application. When the performance of the tasks described above are triggered by the opening of the message for viewing by a user, it is less likely that such tasks would be performed unnecessarily (e.g. if the user ultimately never opens a message that has arrived at the user's computing device), thereby preserving bandwidth. However, in variant embodiments, a message may be considered as being received by the user when the message has arrived at the user's computing device for storage (e.g. in the user's "inbox"), even though the user may not have actually opened the message yet for viewing.

Figure 7A:
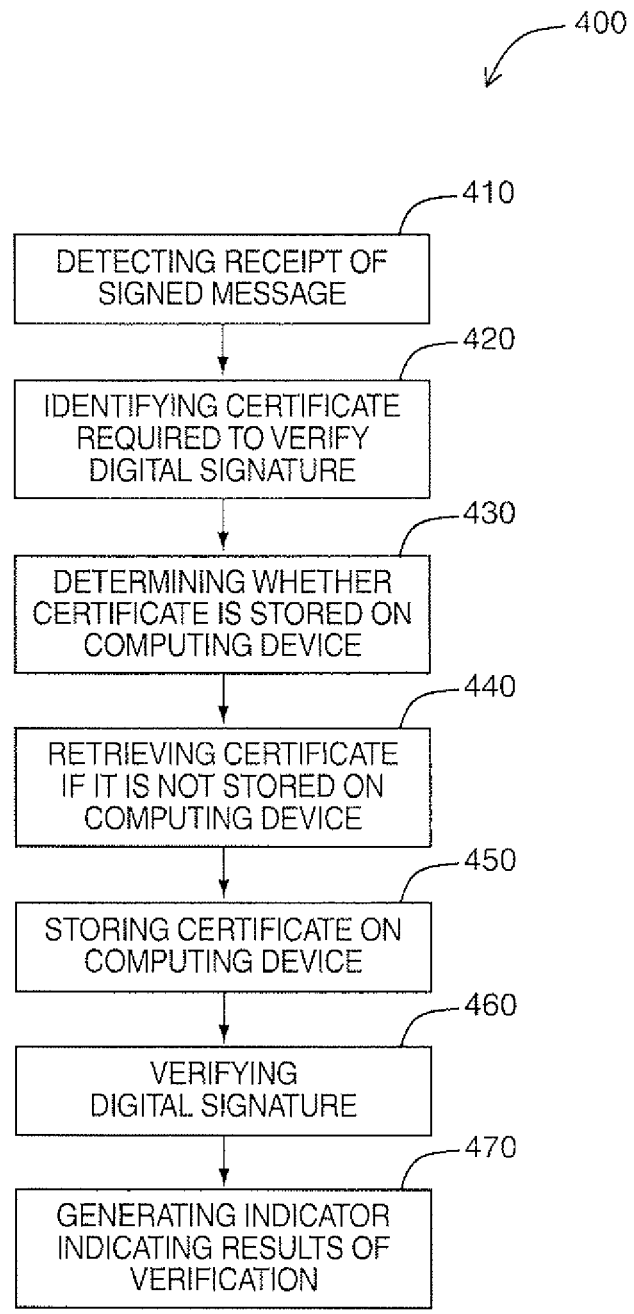
FIG. 7A is a flowchart illustrating steps in a method of retrieving certificates associated with senders of digitally signed messages received at a computing device in an embodiment of the invention.

Referring to FIG. 7A, a flowchart illustrating steps in a method of retrieving certificates associated with senders of digitally signed messages received at a computing device in an embodiment of the invention is shown generally as 400. Further details with respect to various steps of method 400 have been discussed in the foregoing description.

In method 400, by way of example, the steps are described as being performed by an e-mail application that executes and resides on a mobile device. However, in variant embodiments, an application other than an e-mail application may perform the steps of the method. Furthermore, in variant embodiments, the application may be residing and executing on a computing device other than a mobile device operated by a user, or on an intermediate server coupled to a mobile or other computing device operated by a user, for example. The method may also be implemented through multiple applications executing and residing on the mobile or other computing device.

At step 410, the e-mail application detects the receipt by a user of a digitally signed message that comprises a digital signature of the sender of the message. In this embodiment, the message is considered as being received by the user when the user opens the message.

At step 420, the certificate associated with the sender that comprises the public key capable of verifying the digital signature is identified by the e-mail application. Information required to identify the certificate may be provided within the received message. This information may include an identification of the certificate's issuer and serial number, or the certificate's thumbprint for example.

In this embodiment, this step is performed only after the user opens the message. However, in a variant embodiment, this step may be performed when the message arrives at the device (e.g. when placed in an "inbox" folder for messages) but before the user opens the message. This is so that when the user actually opens the message, the user need not wait for this step to complete.

At step 430, the application determines whether the certificate identified at step 420 is already stored on the mobile device. For example, the certificate may be temporarily stored on the mobile device if the certificate accompanied the received message, or may be more permanently stored in a certificate store on the mobile device.

In this embodiment, this step is also performed only after the user opens the message. However, in a variant embodiment, this step may be performed when the message arrives at the device and after step 420 is performed, but before the user opens the message. This is so that when the user actually opens the message, the user need not wait for this step to complete.

At step 440, the application automatically initiates retrieval of the requisite certificate from a certificate store remotely located from the computing device if the certificate is not stored on the computing device as determined at step 430, upon the user opening the message. The certificate store from which an attempt to retrieve the certificate is made may be one of one or more LDAP servers, or an intermediate server, for example.

Although other intervening steps (e.g. steps 420 and 430) may be performed between step 410 and step 440, step 440 is effectively triggered by the opening of the message by the user as detected at step 410, so that the certificate will be retrieved automatically, when it is likely that the user will be considering the message. Accordingly, the user need not initiate retrieval of the requisite certificate manually.

Optionally, at step 450, the certificate retrieved at step 440 may be automatically stored more permanently in a certificate store on the mobile device, without user intervention (i.e. the user need not perform manual steps for the certificate to be stored). However, in a variant embodiment of the invention, some user input may be required by the application before the certificate is stored (e.g., the user may be prompted for a password to authorize the application to modify the contents of the certificate store on the user's computing device).

In this embodiment, at step 460, the application also automatically verifies the digital signature using the certificate retrieved at step 440, without user intervention (i.e. the user need not perform manual steps to initiate verification of the digital signature). This step is performed automatically as a convenience to the user. However, in a variant embodiment, the application may require that the user perform at least one manual step to initiate verification of the digital signature after the certificate is retrieved at step 440.

At step 470, an indicator may be generated for display to the user that indicates whether the digital signature was successfully verified at step 460.

Figure 7B:
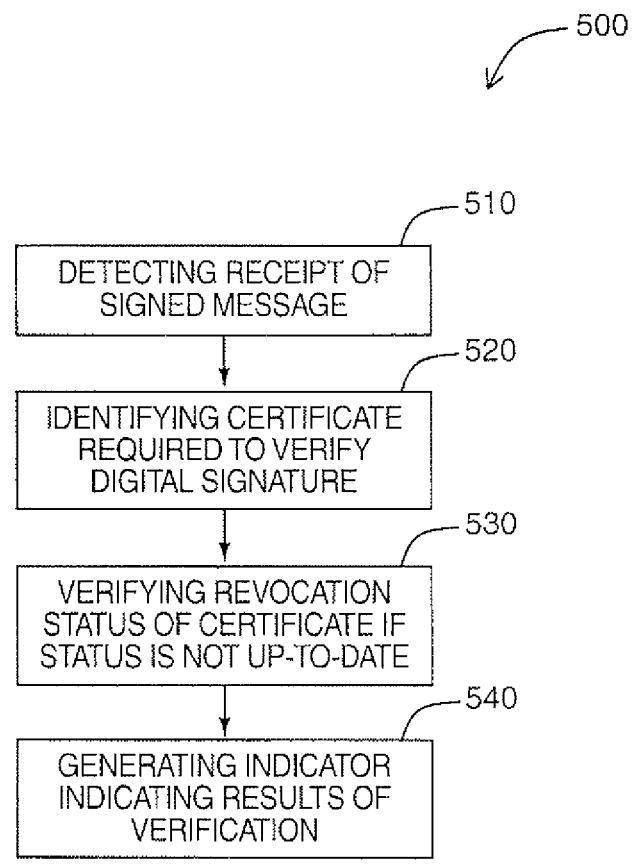
FIG. 7B is a flowchart illustrating steps in a method of verifying the revocation status of certificates associated with senders of digitally signed messages received at a computing device in an embodiment of the invention.

Referring now to FIG. 7B, a flowchart illustrating steps in a method of verifying the revocation status of certificates associated with senders of digitally signed messages received at a computing device in an embodiment of the invention is shown generally as 500. Further details with respect to various steps of method 500 have been discussed earlier in this specification.

In method 500, by way of example, the steps are described as being performed by an e-mail application that executes and resides on a mobile device. However, in variant embodiments, an application other than an e-mail application may perform the steps of the method. Furthermore, in variant embodiments, the application may be residing and executing on a computing device other than a mobile device operated by a user, or on an intermediate server coupled to a mobile or other computing device operated by a user, for example. The method may also be implemented through multiple applications executing and residing on the mobile or other computing device.

At step 510, the e-mail application detects the receipt by a user of a digitally signed message that comprises a digital signature of the sender of the message. In this embodiment, the message is considered as being received by the user when the user opens the message.

At step 520, the certificate associated with the sender that comprises the public key capable of verifying the digital signature is identified by the e-mail application and located on the mobile device. Information required to identify the certificate may be provided within the received message. This information may include an identification of the certificate's issuer and serial number, or the certificate's thumbprint for example. This information can then be used to locate the requisite certificate on the mobile device. The certificate may already have been stored on the device before the message arrived at the device, or it may have been more recently retrieved from a certificate store (e.g. a remote LDAP server).

In a variant embodiment, the information required to identify the certificate may be used to verify the revocation status of the certificate at step 520 without requiring that the certificate be located on the mobile device. In the event that the revocation status of a certificate can be retrieved from a source of revocation status data by the application without requiring the certificate itself, an updated revocation status may be obtained without having to first retrieve the actual certificate (assuming that the certificate is not already stored on the mobile device). Certain manual and/or automated actions may then be performed in response. If the certificate has been revoked, the application might not automatically initiate retrieval of the certificate, or the user might elect not to download the entire message, for example.

In this embodiment, step 520 is performed only after the user opens the message. However, in a variant embodiment, this step may be performed when the message arrives at the device (e.g. when placed in an "inbox" folder for messages) but before the user opens the message. This is so that when the user actually opens the message, the user need not wait for this step to complete.

At step 530, the application can automatically initiate and perform a verification of the revocation status of the certificate, if the revocation status of the certificate is not up-to-date. In this embodiment, step 530 comprises determining the amount of time that has elapsed since the revocation status of the certificate was last verified. This determination may be facilitated by comparing the current time with a time stamp associated with the certificate that identifies the last time the revocation status of the certificate was updated, for example. Other means of tracking the elapsed time since the last update may be employed in variant embodiments.

Step 530 also comprises automatically retrieving the revocation status (e.g. from an OCSP server) if the determined amount of time exceeds a pre-specified limit, which may have been established by the user or defined by IT Policy.

Although other intervening steps (e.g. step 520) may be performed between step 510 and step 530, step 530 is effectively triggered by the opening of the message by the user as detected at step 510, so that the revocation status can be potentially updated (depending on the length of time that has elapsed since the last update) automatically, every time a user opens (or re-opens) the message. The user need not initiate a verification of the revocation status of the certificate manually.

At step 540, an indicator may be generated for display to the user that indicates the result of the verification of the revocation status as performed at step 530.

The methods described in FIGS. 7A and 7B need not both be implemented in an application executing on a given computing device. An application executing on a computing device may be programmed to perform the steps of either one of these methods. Alternatively, the application may be programmed to perform a combination of the method steps as described with reference to FIG. 7C.

Figure 7C:
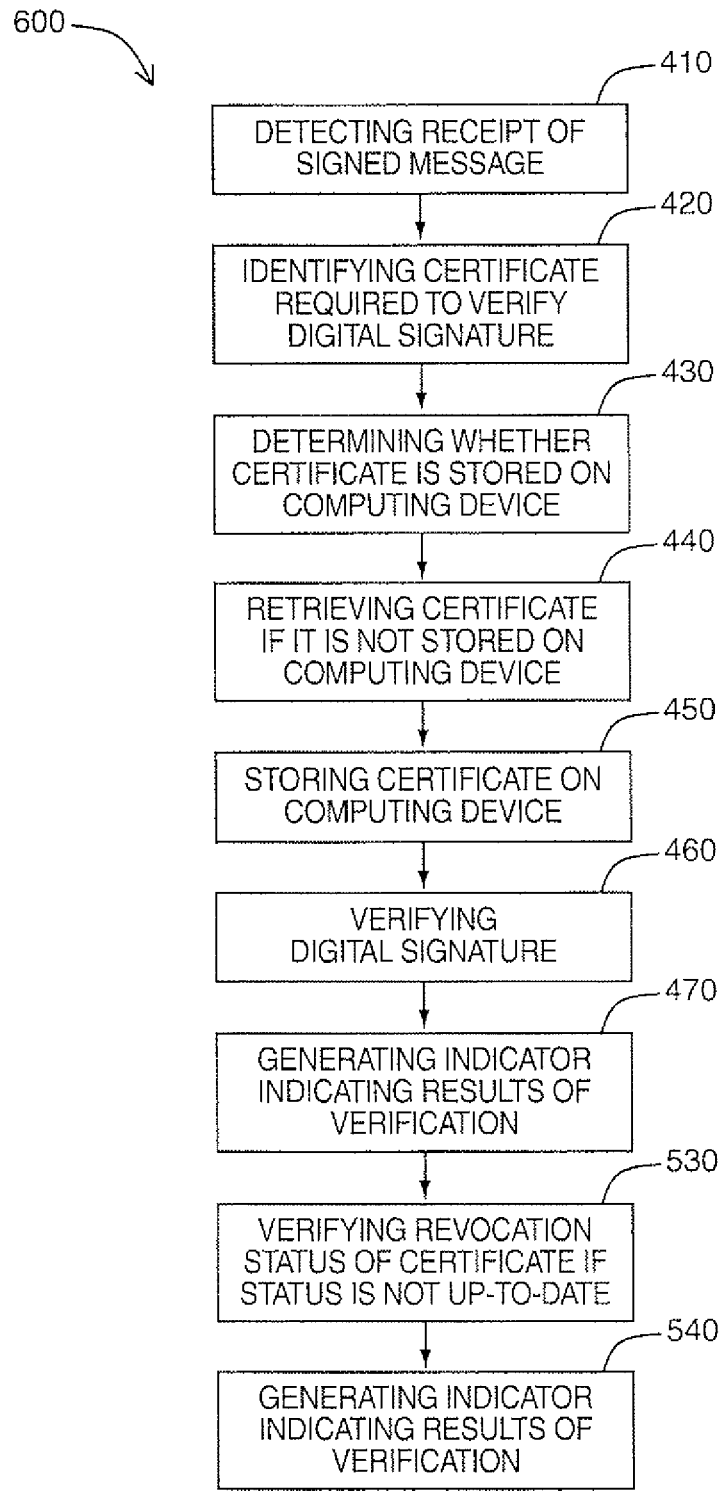
FIG. 7C is a flowchart illustrating steps in a method of retrieving certificates associated with senders of digitally signed messages received at a computing device in a variant embodiment of the invention.

Referring to FIG. 7C, a flowchart illustrating steps in a method of retrieving certificates associated with senders of digitally signed messages received at a computing device in a variant embodiment of the invention is shown generally as 600.

In this embodiment, the steps of the methods described in FIGS. 7A and 7B are effectively combined. The task of retrieving certificates that is performed by the application, and possibly a verification of a certificate's digital signature, is automatically triggered by the receipt (e.g. opening) of a message (e.g. e-mail message) if the certificate is not already stored on the computing device (e.g. mobile device), as was described with reference to FIG. 7A and steps 410 through 470. Subsequently, once the certificate is retrieved, verification of the revocation status by the application is automatically performed, as described with reference to FIG. 7B and steps 530 through 540. In this manner, a number of tasks that traditionally required manual initiation by users can be performed automatically by the application without such user intervention. Accordingly, security with respect to digitally signed messages received by a user may be enhanced.

In a variant embodiment, steps related to the verification of the revocation status of a certificate may be performed prior to steps related to the retrieval of the certificate.

In variant embodiments, the methods described with reference to FIGS. 7A to 7C may further comprise the step of automatically initiating and performing a verification of one or more other certificate properties, without user intervention (i.e. the user need not perform manual steps to initiate the verifications). For example, such certificate properties may include the trust status of a certificate, the expiration status of the certificate, and the strength of the public key of the certificate. An indicator may be generated for display to the user that indicates a result of the verification of the one or more certificate properties.

The steps of the methods described herein may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method of retrieving certificates, the method comprising:
after a message comprising a digital signature of a sender is received at a communication device but before the message is user-selected for opening:
identifying a certificate associated with the sender, wherein the certificate is not included with the message;
determining whether the certificate is stored on the communication device; and
initiating retrieval of the certificate.

2. The method of claim 1, wherein the initiating comprises initiating retrieval of the certificate from a certificate store remotely located from the communication device if the certificate is determined not to be stored on the communication device.

3. The method of claim 2, further comprising storing, at the communication device, the certificate retrieved from the certificate store remotely located from the communication device.

4. The method of claim 3, wherein the storing the certificate is performed after the certificate is retrieved from the certificate store remotely located from the communication device, without user intervention.

5. The method of claim 1, further comprising verifying the digital signature using the certificate.

6. The method of claim 5, further comprising generating an indicator for display at the communication device, the indicator indicating whether the digital signature is successfully verified.

7. The method of claim 6, wherein at least one of the verifying or the generating are performed after retrieval of the certificate is initiated, without user intervention.

8. The method of claim 1, wherein the message comprises an electronic mail message.

9. The method of claim 1, wherein retrieval of the certificate is initiated after the determining, without user intervention.

10. The method of claim 1, further comprising verifying at least one certificate property of the certificate, and generating an indicator that indicates a result of the verifying.

11. The method of claim 10, wherein the at least one certificate property comprises at least one of a trust status of the certificate, a strength of a public key associated with the certificate, or an expiration status of the certificate.

12. A communication device comprising: a processor, and a memory; wherein the processor is configured to:
after a message comprising a digital signature of a sender is received at the communication device but before the message is user-selected for opening:
identify a certificate associated with the sender, wherein the certificate is not included with the message;

determine whether the certificate is stored on the communication device; and initiate retrieval of the certificate.

13. The device of claim 12, wherein the processor is configured to initiate retrieval of the certificate from a certificate store remotely located from the communication device if the certificate is determined not to be stored on the communication device.

14. The device of claim 13, wherein the processor is further configured to store, at the communication device, the certificate retrieved from the certificate store remotely located from the communication device.

15. The device of claim 14, wherein the processor is configured to store the certificate after the certificate is retrieved from the certificate store remotely located from the communication device, without user intervention.

16. The device of claim 12, wherein the processor is further configured to verify the digital signature using the certificate.

17. The device of claim 16, wherein the processor is further configured to generate an indicator for display at the communication device, the indicator indicating whether the digital signature is successfully verified.

18. The device of claim 17, wherein at least one of verifying the digital signature or generating the indicator are performed after retrieval of the certificate is initiated, without user intervention.

19. The device of claim 12, wherein the message comprises an electronic mail message.

20. The device of claim 19, wherein the processor is configured to initiate retrieval of the certificate after determining whether the certificate is stored on the communication device, without user intervention.

21. The device of claim 12, wherein the processor is further configured to verify at least one certificate property of the certificate, and generate an indicator that indicates a result of verifying the at least one certificate property of the certificate.

22. The device of claim 21, wherein the at least one certificate property comprises at least one of a trust status of the certificate, a strength of a public key associated with the certificate, or an expiration status of the certificate.

23. A computer-readable storage device, comprising a plurality of instructions executable by a processor of a communication device, wherein the instructions configure the processor to:

after a message comprising a digital signature of a sender is received at the communication device but before the message is user-selected for opening:

identify a certificate associated with the sender, wherein the certificate is not included with the message;

determine whether the certificate is stored on the communication device; and initiate retrieval of the certificate.

\* \* \* \* \*